United States Patent [19]

Angehrn

[11] 4,002,063
[45] Jan. 11, 1977

[54] WELL LOGGING PAD DEVICES HAVING DIFFERENTIAL PRESSURE RELIEF

[75] Inventor: Jorg August Angehrn, Houston, Tex.

[73] Assignee: Dresser Industries, Inc., Dallas, Tex.

[22] Filed: Sept. 26, 1975

[21] Appl. No.: 616,967

[52] U.S. Cl. .................................. 73/152; 166/100
[51] Int. Cl.² ......................................... E21B 49/00
[58] Field of Search .................... 73/152, 155, 154; 166/100

[56] References Cited
UNITED STATES PATENTS

| | | | |
|---|---|---|---|
| 2,313,176 | 3/1943 | Shelby .................. | 166/100 |
| 2,851,107 | 9/1958 | Chivens et al. .......... | 166/100 |
| 3,028,542 | 5/1962 | Terry ................... | 73/155 |
| 3,566,682 | 3/1971 | Winkler ................. | 73/152 |
| 3,577,782 | 5/1971 | Aitken .................. | 73/155 |

*Primary Examiner*—James J. Gill
*Assistant Examiner*—Anthony V. Ciarlante
*Attorney, Agent, or Firm*—William E. Johnson, Jr.

[57] ABSTRACT

A well logging instrument comprises a focus section having a focus upper guard, a center electrode and lower focus guard. The bottom section of the instrument includes a pad device having electrodes on its borehole wall-engaging surface and adapted to be urged against the borehole wall and also having a plurality of pressure relief holes formed therein to reduce differential pressure which might otherwise build up between the surface of the pad and the borehole wall. The remote electrode of the focus portion of the instrument is the armor surrounding the logging cable. The lower focus guard serves a dual function in that it is also the mini-focus remote electrode. Means are provided for measuring the potential between the focus guard and the cable armor and also between the microguard and the lower focus guard, both measurements then being sent up the logging cable to the surface electronics.

4 Claims, 5 Drawing Figures

WELL LOGGING PAD DEVICES HAVING DIFFERENTIAL PRESSURE RELIEF

BACKGROUND OF THE INVENTION

This invention relates generally to an apparatus for the logging of earth boreholes and specifically to a well logging device having one or more pads adapted to be urged against the borehole wall.

It is well known in the art of well logging to utilize apparatus having an elongated body adapted to traverse an earth borehole and also having one or more pad devices extendible from the main body into engagement with the borehole wall. When using such devices, pressure frequently builds up between the face of the measuring pad and the borehole wall which can seriously damage the measuring device. Those in the art, while recognizing that such a differential pressure exists, have concentrated their efforts on controlling the force with which the pad is pushed up against the wall. Not infrequently, this has resulted in inferior measurements made with the wall logging instrument.

It is therefore the primary object of the present invention to provide a new and improved apparatus for logging earth boreholes with apparatus of the type using pad devices which are provided with means for equalizing the pressure across the pad; and It is also an object of the present invention to provide a new and improved well logging apparatus having one or more pad assemblies in which such pads have been perforated in a manner which tends to minimize the effect of the holes on the focusing properties of the electrode arrangement.

The objects of the invention are accomplished, generally, by a well logging apparatus having one or more pad assemblies thereon adapated for urging the same against the borehole wall, such pads being characterized by one or more pressure relief holes therein which tend to eliminate the buildup of a differential pressure across the pad.

These and other objects, features and advantages of the present invention will be more readily appreciated from a reading of the following detailed specification and drawing, in which.

Figures 1, 3:
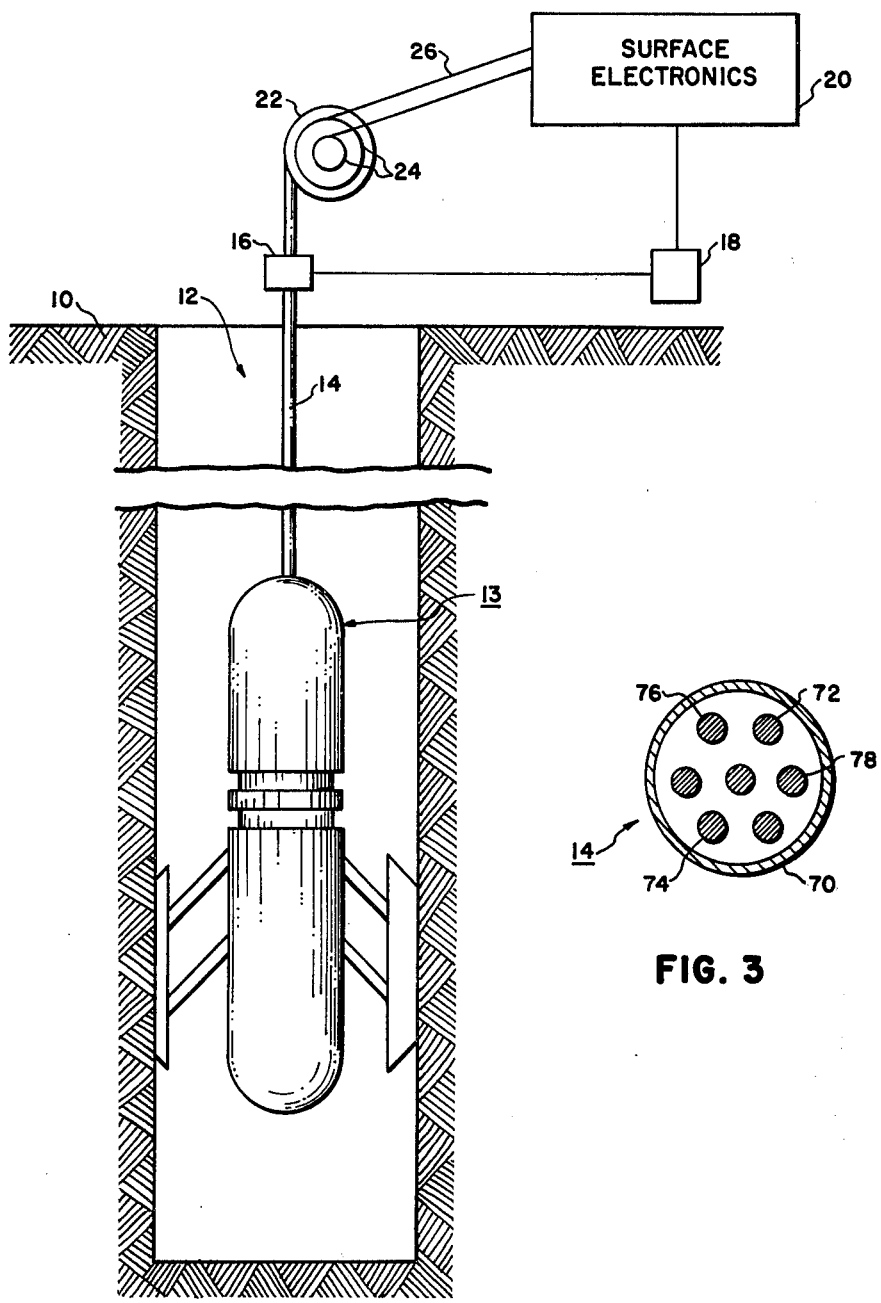
FIG. 1 is a schematic illustration of a well logging operation showing the logging instrument supported in a borehole from the surface equipment.
FIG. 3 illustrates in cross section the logging cable used with the invention.

Referring now to the drawing in more detail, FIG. 1 illustrates a portion of the earth's surface 10 into which a borehole 12 has been drilled. Disposed within the borehole and adapted to be raised and lowered therein is a borehole instrument 13 supported by a cable 14 from the earth's surface. The apparatus on the surface of the earth consists of a measuring wheel 16 over which the cable 14 passes and a drum 22 on which the cable is wound, or from which it is unwound, when the instrument 13 is caused to traverse the borehole 12. The conductors 26 are connected to the conductors within the cable 14 by means of the sliprings 24 and brushes (not illustrated) carried on one end of the drum 22. The conductors 26 lead into the surface electronics section 20. The surface electronics 20 includes the necessary conventional amplifying and recording equipment for recording a pair of signals from the subsurface instrument 13 which has been transmitted over the cable 14. Such a recorder might, for example, have a pair of recording heads for the two focused section signals. The measuring wheel 16 is also connected to drive the transmission means 18 which causes the recorder (not illustrated) within the surface electronics 20 to record the subsurface measurements as a function of depth within the borehole in the conventional manner.

Figure 2:
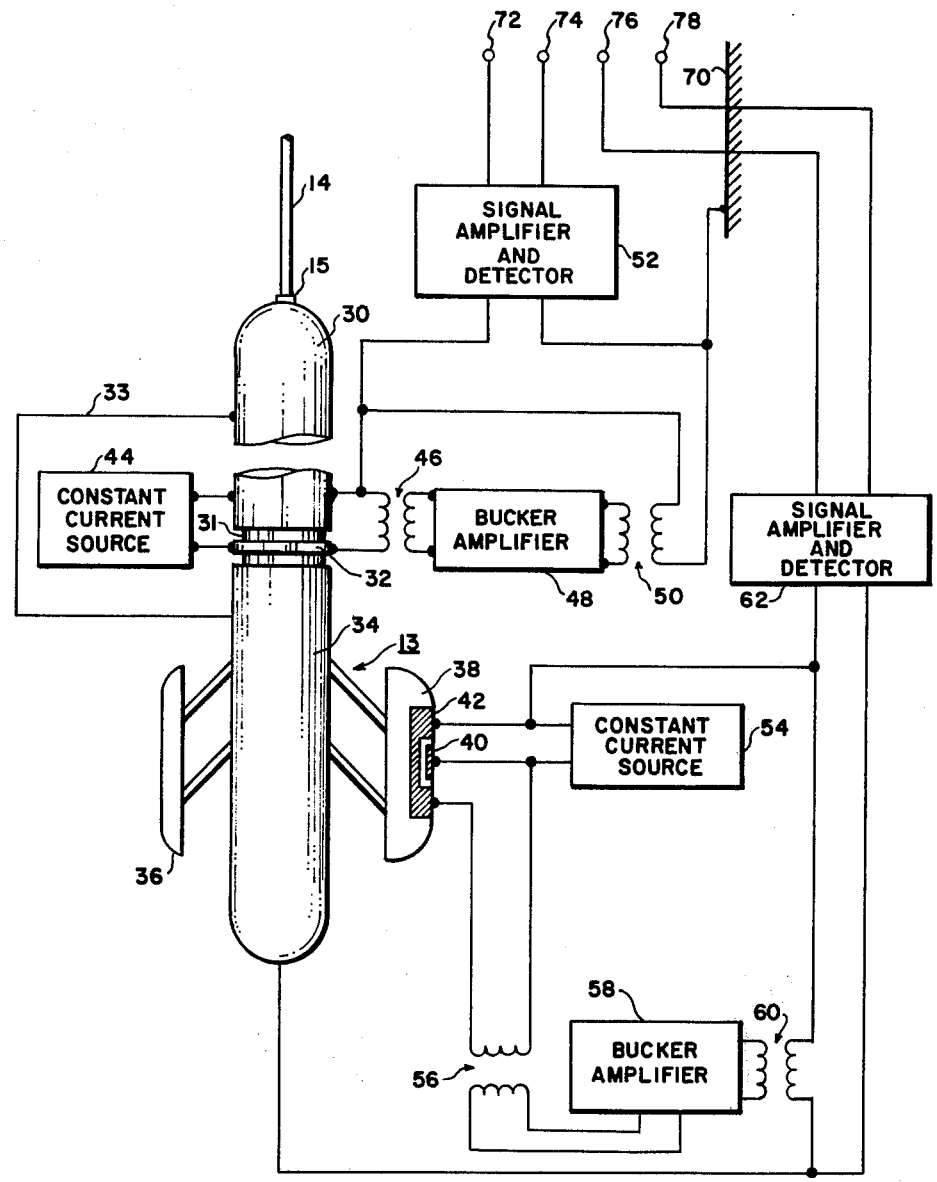
FIG. 2 illustrates schematically a borehole instrument according to the invention.

Referring now to FIG. 2, there is illustrated schematically the borehole instrument 13 according to the invention and the electronics (partly in block diagram) found therein. The supporting cable 14, being armor-plated to provide a remote electrode as is explained hereinafter, is coupled into the top section of the instrument 13 through an insulator 15 so that the armor-plate of the cable 14 will not necessarily be maintained at the same electrical potential as that of the upper guard electrode 30 of the borehole instrument. The upper guard electrode 30 approximately 7 feet 2 inches in length. Immediately beneath the upper guard electrode 30 is an insulator section 31, for example, comprised of ceramic, and then a center electrode 32. The center electrode 32 is approximately 6 inches in height. Although different heights can be used for the center electrode, it has been shown that with such dimensions, approximately 75 percent of the resistivity measurement covers a diameter of 12 feet around the borehole. Likewise, 90 precent covers a diameter of 26 feet.

A lower guard section 34 forms the bottom portion of the instrument 13 and is separated from the center electrode 32 by a similar insulator as insulator 31 which separates the center electrode from the upper guard section 30. The upper guard section 30 is maintained at the same electrical potential as that of the lower guard section 34, for example, as by the conductor 33.

It should be appreciated that while the insulator sections 31 which separate the upper guard 30 from the center electrode 32 and the center electrode 32 from the lower guard section 34 are shown, for ease of illustration, as being recessed from the periphery of the instrument 13, the sides of the insulators can coincide, or even extend from, the sides of the instrument 13 if desired.

A constant current source 44 is connected to the center electrode 32. Although the constant current source could provide either an AC or DC current to the center electrode 32, a preferred embodiment contemplates that a low frequency alternating current is applied to the center electrode. Also connected between the center electrode 32 and the upper guard electrode 30 is an error transformer 46 which continuously monitors and senses any potential difference between the center electrode 32 and the guard electrodes 30 and 34. Any difference in potential is amplified by the bucker amplifier 48 and coupled through the transformer 50 to supply a signal back to the guard electrodes 30 and 34, thus maintaining the guard electrodes at substantially the same electrical potential as the center electrode 32. Also connected to the guard electrode 30 is a signal amplifier and detector section 52 which provides an indication of the electrical potential of the guard electrode 30 with respect to the armor-plate 70 of the cable 14. The DC voltage output of the signal amplifier and detector section 52 is coupled through the cable 14 by conductors 72 and 74 for transmission to the earth's surface.

In the operation of the focused logging section thus far described, the electrical potential on each of the upper and lower guard sections, being sections 30 and 34, respectively, is maintained at substantially the same as that of the center electrode 32. With such a configuration, the constant current source 44 causes the center electrode 32 to pass or emit a current beam approximately 6 inches in height about 11 feet or more into the adjacent earth formations. Some distance further into the formations, the current beam swings upward into the armor-plated shield 70 of the cable 14 and the resistivity of the formation causes there to be a difference in the electrical potential between the guard electrode 30 and the remote point 70 on the cable 14.

The lower guard section 34 of the instrument 13 is approximately 7 feet 3 inches in length. A borehole wall-engaging pad member 38 is mechanically connected with the guard electrode 34. Also connected to the lower guard member 34 is a backup shoe 36 which engages another side of the borehole wall, thus causing the pad member 38 to continuously contact the borehole wall while the instrument 13 traverses the borehole. It should be appreciated that the backup shoe 36 and the pad 38 can be supported from the guard member 34 by spring members, hydraulic members or by any other means known in the art for causing each of them to engage the borehole wall.

The pad member 38, shown in greater detail in FIG.'s 4 and 5, being fabricated for the most part from an insulating material, for example, of hard rubber, contains one center electrode 40 around which are one or more guard electrodes 42. A constant current source 54 causes a focused beam of current to be passed or emitted from the center electrode 40. Through the use of the error-sensing transformer 56, the bucking current amplifier 58 and transformer 60, the electrical potential on the guard ring 42 is maintained substantially the same as that on the center electrode 40, in an analogous manner as that described above with respect to the other focused section. The guard electrode 42 is also connected to the signal amplifier and detector section 62 which measured the electrical potential between the lower guard electrode 34 and the guard ring 42 of the minifocused pad device. The conductors 76 and 78 are coupled out of the signal amplifier and detector section 62 through the cable 14 for transmission of the DC signals to the earth's surface.

FIG. 3 illustrates a typical seven-conductor logging cable having an armor-plated shield 70. As illustrated in FIG. 3, the DC signals from the signal amplifier detector section 52 are coupled through the conductors 72 and 74, whereas the DC signals from the signal amplifier and detector section 62 are coupled through the conductors 76 and 78, the signals on conductors 76 and 78 being indicative of the electrical potential detected by the minifocused (shallow investigation) section, and the signals on the conductors 72 and 74 being indicative of the electrical potential detected by the focused (deep investigation) section.

Figure 4:
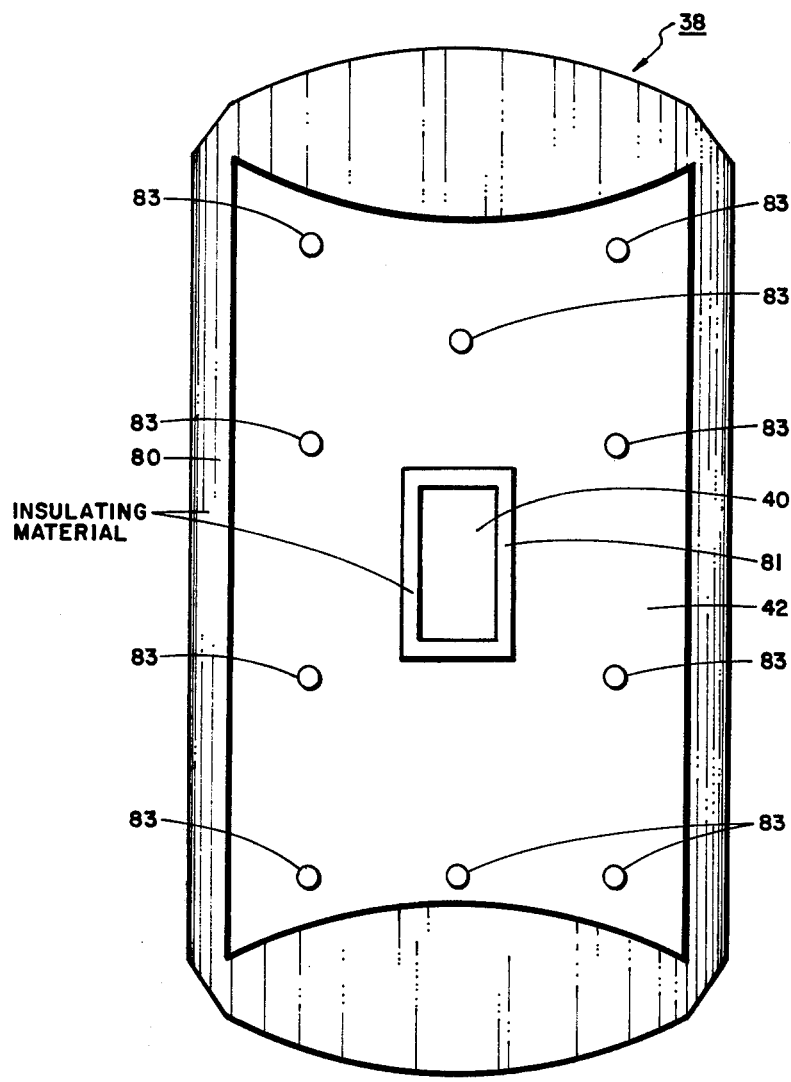
FIG. 4 is a plan schematic view of a pad constructed in accordance with the present invention.

Referring now to FIG. 4, the pad 38 as illustrated in FIG.'s 1 and 2 is shown in greater detail. The pad 38 includes an area 80 around the periphery of the well bore wall-engaging surface which is formed of an insulating material, for example, hard rubber. A rectangular-shaped electrode 40 is formed in the center of the well bore wall-engaging surface of pad 38 and is formed of any suitable electrode material. The center electrode 40 is surrounded by a thin ring-shaped layer of insulating material 81 around its periphery, for example, fabricated from hard rubber. A guard electrode 42 surrounds the insulating material 81 and covers a large portion of the wall-engaging surface of the pad 38. A plurality of holes 83 are drilled or otherwise formed through the electrode 42 and the insulating material 80, as is best illustrated in FIG. 5.

Figure 5:
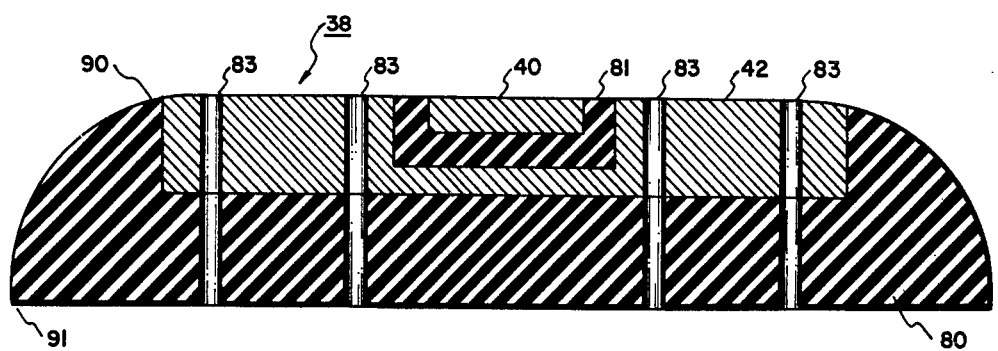
FIG. 5 is an elevational view, in cross section, of a pad constructed in accordance with the present invention.

Referring now to FIG. 5, it can be seen that the pad 38 has a front or wall-engaging surface 90 and a back surface 91 which would be nearer to the main instrument housing 13 as illustrated in FIG. 2. As further illustrated in FIG. 5, the plurality of holes 83 are formed through the electrode 42 and also through the insulating material 80.

In forming the holes 83, for example, by drilling or perforating the pad 38, those skilled in the art will recognize that some experimentation may be necessary in the fabrication of the pad in order to minimize the effect of the holes on the focusing properties of the electrode arrangement. Thus, the specific size and location of the pressure relief holes may depend upon the arrangement of the electrodes, the internal components within the pad and other geometric considerations.

In the operation of the apparatus of FIG. 2 having the pad arrangement 38, it should be appreciated that as the pad 38 is urged against the borehole wall, any pressure that might have otherwise been built up across the pad, that is, between the surfaces 90 and 91, will be relieved because of the holes 83.

Thus it should be appreciated that there has been illustrated and described herein an apparatus which allows pressure which would have otherwise been built up across a pad assembly to be relieved. Although the preferred embodiment contemplates the use of a plurality of pressure relief holes, those skilled in the art will recognize that a single relief hole will provide some degree of relief from the pressure built up. Likewise, geometric placements of such pressure relief holes other than those illustrated and described herein will be obvious to those skilled in the art from a reading of the foregoing detailed specification. Furthermore, although the preferred embodiment has been illustrated and described with respect to a well logging instrument using focused logging sections, those skilled in the art will recognize that other types of well logging and perforating apparatus can use one or more pad assemblies built in accordance with the present invention wherein one or more pressure relief holes are used in such pads. For example, acoustic, radioactivity, or other such well logging instruments can use pad assemblies built in accordance with the present invention having differential pressure relief.

The embodiments of the invention in which an exclusive property or privilege is claimed are defined as follows:

1. An apparatus for investigating earth formations traversed by a borehole, comprising:
an elongated support member adapted for movement through a borehole; and
an auxiliary pad member connected to said support member and adapted to be urged against the borehole wall, said pad member having first and second surfaces, said first surface including at least one electrode and adapted to engage the borehole wall, and said pad member having at least one fluid channel between said first and second surfaces adapted to be continuously open during the operation of said apparatus for preventing the build-up of excess pressure between said first and second surfaces.

2. The apparatus according to claim 1 wherein said at least one fluid channel comprises a plurality of said channels.

3. An apparatus for investigating earth formations traversed by a borehole, comprising:

an elongated support member adapted for movement through a borehole; and an auxiliary pad member connected to said support member and adapted to be urged against the borehole wall, said pad member having first and second surfaces, said first surface including at least one electrode and adapted to engage the borehole wall said pad having means to substantially prevent the build-up of pressure between said first and said second surfaces.

4. The apparatus according to claim 3 wherein said means to equalize the pressure comprises at least one pressure relief conduit.

* * * * *